United States Patent [19]

Frank

[11] 4,074,995
[45] Feb. 21, 1978

[54] METHOD OF SHAPING GLASS SHEETS BY THE ROLL FORMING METHOD
[75] Inventor: Robert G. Frank, Murrysville, Pa.
[73] Assignee: PPG Industries, Inc., Pittsburgh, Pa.
[21] Appl. No.: 752,379
[22] Filed: Dec. 20, 1976
[51] Int. Cl.$^2$ .............................................. C03B 29/04
[52] U.S. Cl. ............................................ 65/104; 65/106
[58] Field of Search ................ 65/104, 106, 245, 253, 65/273, 286

[56] References Cited
U.S. PATENT DOCUMENTS

| | | | |
|---|---|---|---|
| 3,223,501 | 12/1965 | Fredley et al. | 65/106 X |
| 3,396,000 | 8/1968 | Carson et al. | 65/104 |
| 3,676,098 | 7/1972 | Hall | 65/106 |
| 3,701,643 | 10/1972 | Frank | 65/273 X |
| 3,701,644 | 10/1972 | Frank | 65/273 X |
| 3,807,546 | 4/1974 | Canonaco | 198/780 |
| 3,807,982 | 4/1974 | Claassen et al. | 65/253 |
| 3,856,499 | 12/1974 | Frank | 65/104 |
| 3,869,269 | 3/1975 | Knapp | 65/106 |
| 3,871,855 | 3/1975 | Frank | 65/245 |
| 3,891,420 | 6/1975 | Frank | 65/106 |
| 3,923,488 | 12/1975 | Pytel et al. | 65/104 X |
| 3,929,441 | 12/1975 | Frank | 65/106 |
| 3,934,996 | 1/1976 | Frank | 65/106 |
| 3,978,974 | 9/1976 | Morrissey et al. | 198/782 |
| 3,992,181 | 11/1976 | Frank | 65/104 |

Primary Examiner—Arthur D. Kellogg
Attorney, Agent, or Firm—Dennis G. Millman; Edward I. Mates

[57] ABSTRACT

The present invention relates to a method of reducing the severity of edge kinking that sometimes occurs when heated glass sheets are shaped by roll forming. The improvement comprises superficially cooling one or both side edge portions of each glass sheet between a furnace exit and a roll forming station where its undersurface is lifted by a set of lower rotating forming rolls having a concave configuration in their axial direction which is transverse to the direction of glass sheet movement.

8 Claims, 4 Drawing Figures

METHOD OF SHAPING GLASS SHEETS BY THE ROLL FORMING METHOD

BACKGROUND OF THE INVENTION

This invention relates to the shaping of glass sheets by roll forming. As described in U.S. Pat. No. 3,701,644 to Robert G. Frank, the roll forming method comprises conveying a succession of glass sheets through a furnace where each sheet in turn is heat softened and without stopping the sheets, momentarily engaging the opposite surfaces of each heat softened glass sheet between opposite sets of rotating forming rolls of complementary shapes as each sheet moves continuously through the roll forming station. Each sheet is disengaged after pressurized engagement for sufficient time to shape the sheet and while the sheet continues to move into a cooling station, where the glass is cooled sufficiently rapidly to impart at least a partial temper thereto.

In the various embodiments of the roll forming apparatus disclosed in the aforesaid patent, glass sheets are engaged between rotating segmented forming rolls that comprise an upper set of rotating forming rolls of convex outer configuration in the axial direction of the upper forming rolls and a lower set of rotating forming rolls having a concave outer configuration along the axis of the lower forming rolls that is complementary to the convex outer configuration of the upper rolls. The lower set of forming rolls move upward from a recessed position below a plane of support defined by spaced, rigidly supported, rotating conveyor rolls into a glass sheet engaging position wherein the bottom set of rotating forming rolls engages the glass, first at its side edge portions and then gradually increases the area of engagement inwardly toward the longitudinal center line of the glass as it lifts the latter completely above the rigidly supported conveyor rolls. Because of this initial engagement between the rising rotating forming rolls and the longitudinally extending side edge of the glass sheets, the glass sheets tend to kink along one or both side edges, depending upon the temperature pattern in the furnace in which the glass sheets are heated to a heat softened condition to enable them to be shaped by engagement between opposed sets of shaped rotating forming rolls.

U.S. Pat. No. 3,676,098 to Hall relates to press bending heat softened glass sheets and controls and retains the final bent shape of the sheets by positively cooling flat heated sheets over their entire area between the time they leave a furnace and the time they arrive at a glass shaping station. The Hall patent finds it necessary to positively cool the entire surface of the glass sheet.

U.S. Pat. No. 3,396,000 to Carson, Ferguson, Ritter and Hymore discloses the application of air blasts to the upper surface only adjacent to the opposite longitudinal side edges of glass sheets between a furnace exit and a cooling station in order to impart a bend along restricted areas of the opposite longitudinal side edges of the glass sheet.

SUMMARY OF THE INVENTION

The present invention comprises superficially cooling at least one side edge portion of each glass sheet between the time that the sheet leaves the furnace and is engaged to be lifted by the lower rotating forming rolls in order to reduce the amount of edge kink that would be impressed in the glass sheet during its shaping in the absence of said superficial cooling.

Two types of furnaces are generally used in conjunction with the roll forming method of shaping glass sheets. In one type of furnace, a succession of glass sheets is conveyed on horizontally extending conveyor rolls that are spaced longitudinally of the length of the furnace and extend transversely of the furnace. In such furnaces, both the opposite side edge portions of the glass sheet tend to become a little hotter than the main portion of the sheet. The present invention, when used in conjunction with a furnace provided with a roller conveyor provides superficial cooling along both longitudinal side edges of each glass sheet between the time that the sheet leaves the furnace and the time it is engaged to be lifted by the lower rotating forming rolls.

In another type of furnace, which utilizes the gas hearth heating technique of U.S. Pat. No. 3,223,501 to Fredley and Sleighter, glass sheets are floated in an oblique plane, usually about 2° to 10° to the horizontal, preferably about 5° to the horizontal, with the lower edge of the glass being driven by frictional engagement with a series of rotating driving discs. In such an arrangement, the upper side edge portions of the glass become heated to a higher temperature than the remainder of the glass. The present invention provides superficial cooling along the upper side edge only between the time that the sheet leaves the furnace and the time it is engaged to be lifted by the lower rotating forming rolls in this embodiment.

The present invention reduces the severity of edge kinking along one or both side edges of glass sheets during the roll forming process and will be understood better in the light of a description of illustrative embodiments that follow.

BRIEF DESCRIPTION OF THE DRAWINGS

In the drawings that form part of a description of illustrative embodiments of the present invention wherein like structural elements are designated by like reference numbers.

DESCRIPTION OF THE PREFERRED EMBODIMENTS

Figure 1:
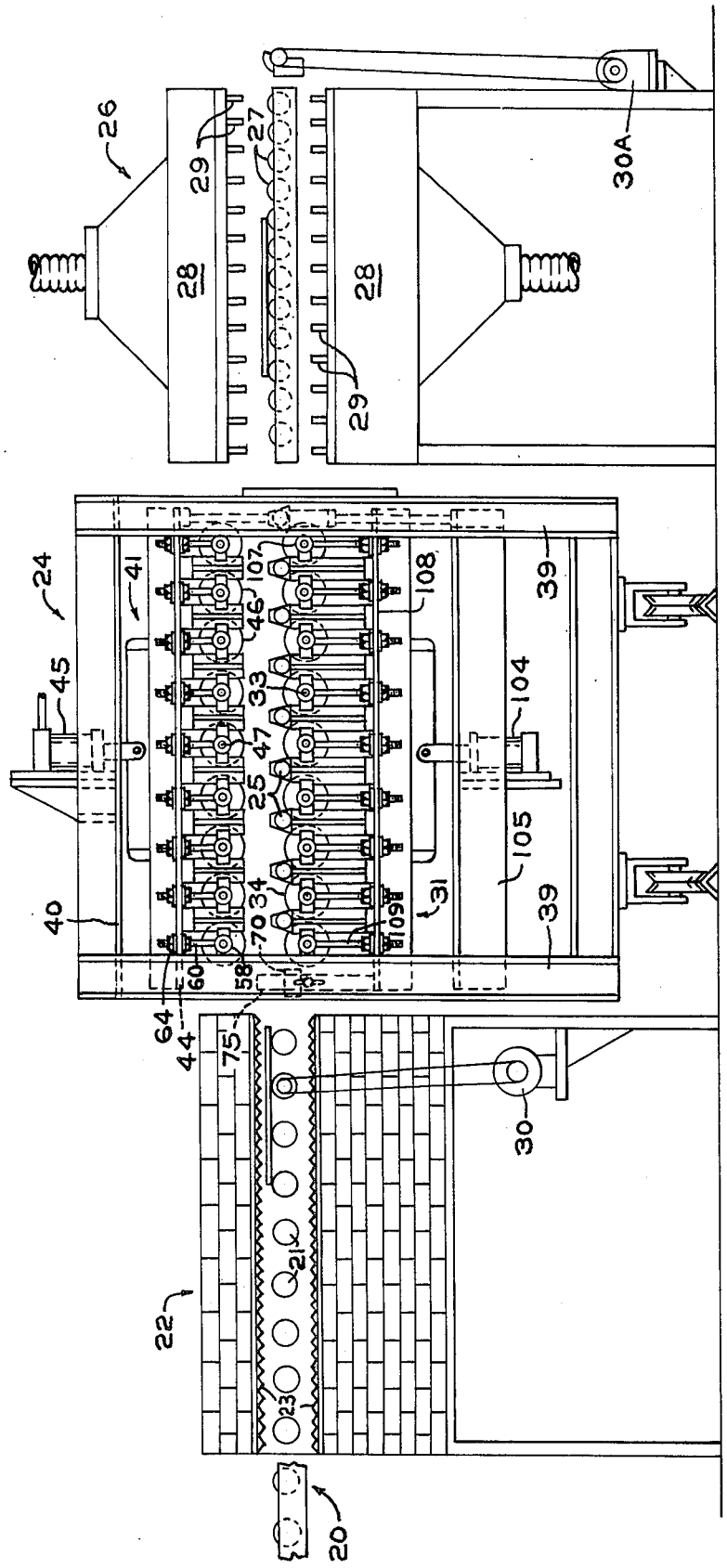
FIG. 1 is a longitudinal side view of an embodiment of the present invention in a roll forming setup utilizing a roller conveyor through the furnace.
Figure 2:
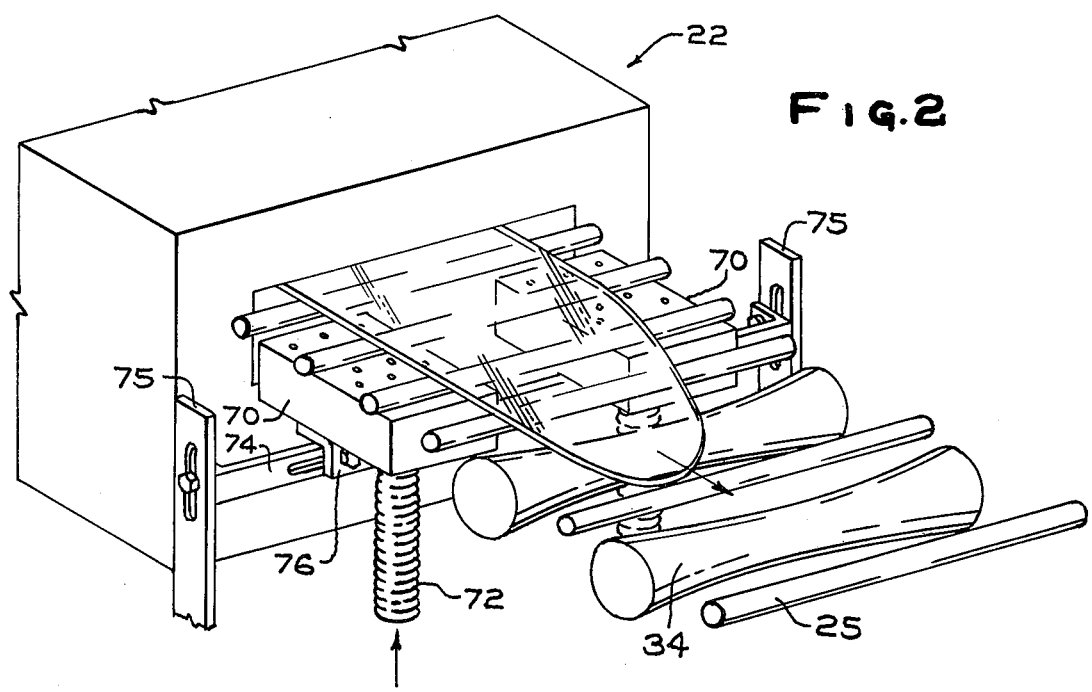
FIG. 2 is a fragmentary, schematic, oblique view showing how the present invention relates to the setup disclosed in FIG. 1.

Referring to FIGS. 1 and 2, the first embodiment of apparatus according to this invention comprises a main horizontal conveyor system 20 comprising a first series of horizontal conveyor rolls 21, each extending across the width of a tunnel-type furnace 22 provided with heating element 23, preferably of the electrical resistance type, supported by the roof and the floor of the furnace and arranged in spaced relation to the horizontal plane of support provided by the uppermost portions of the peripheries of the conveyor rolls 21 to face the major surfaces of the glass sheets conveyed therethrough. Beyond the furnace 22 is a roll forming station 24 which includes rigidly mounted conveyor rolls 25 extending transversely of the conveyor system 20 to provide a horizontal extension of the path provided by the furnace conveyor rolls 21. Beyond the roll forming station 24 is a cooling station 26 provided with additional conveyor rolls 27 that convey glass sheets that have been shaped in the roll forming station between upper and lower nozzle boxes 28, each having a set of elongated slotted nozzle openings 29 extending transversely of the path defined by the portion of the conveyor system 20 that extends through the cooling station 26. Pressurized air from blowers (not shown) is supplied to the upper and lower nozzle boxes 28 for discharge through the nozzle openings 29 to cool bent glass sheets as they are conveyed through the cooling station 26. A drive motor drives most of the conveyor rolls 21 in the furnace and may be selectively clutched to drive conveyor rolls 25 at a speed that is equal to the speed of rotation of the conveyor rolls 21 or may be different as desired. An additional motor 30a may be provided for rotating the conveyor rolls 27 in the cooling station 26.

The roll forming station 24 comprises a lower roll housing 31 rigidly supported in a horizontal plane below the level of conveyor rolls 25. The lower roll housing is rigidly supported by a lower vertical piston 104 in any of different positions determined by the position occupied by the rod for the piston 104. A piston support platform 105 supports a housing for piston 104. The lower roll housing 31 comprises a series of vertically adjustable support structures 107 arranged in rows, each spaced along the length of the portion of the conveyor system that traverses the roll forming station 24 to receive the opposite axial ends of a series of straight lower common shafts 33 on which are mounted lower segmented pressing rolls 34 having an outer surface of concave configuration. The segments are preferably composed of an asbestos cement sold by Johns-Manville under the trademark of TRANSITE.

A base structure 108 is rigidly attached to the upper end of the piston 104 for vertical movement therewith. Each support structure 107 can be adjusted vertically relative to base structure 108 by a corresponding threaded adjustment shaft 109 connecting each of the adjustable support structures 107 and base structure 108. This vertical adjustment determines the vertical position of each end of each lower shaft 33 independently.

Vertical posts 39 support the piston support platform 105, and, in addition, support an upper horizontal platform 40 to which an upper roll housing 41 is adjustably positioned vertically. The upper roll housing 41 comprises a movable platform 44. A piston cylinder 45 is supported on the upper horizontal platform 40 and has the moving end of its piston attached to movable platform 44. In vertical planes intermediate the vertical planes occupied by conveyor rolls 25 and in alignment with the vertical planes occupied by segmented shaping rolls 34 of the lower set is a set of upper segmented shaping rolls 46, each mounted on a straight common shaft 47.

The vertical position of each of the upper segmented rolls 46 is adjustable in a manner similar to the adjustments provided for the lower segmented rolls 34. Each upper shaft 47 is received rotatably in apertures in upper shaft brackets 58. The upper ends of the latter are rigidly connected to the lower ends of threaded rods 60. The latter extend upward through apertures in one or the other of a pair of apertured flanges of moving platform 44. Pairs of adjustment nuts 64 for each threaded rod 60, one nut mounted above the platform 44 and the other nut below the platform 44 determine the vertical position of each end of each upper shaft 47.

The lower segmented forming rolls 34 form a set of substantially continuous rolls having generally concave outer configurations in the axial direction of their straight common shafts 33 conforming to the shape desired for incremental portions of each glass sheet treated about an axis parallel to the path taken by the glass sheets treated. The upper segmented forming rolls 46 have generally convex outer configurations that are complementary to the concave configurations of the corresponding lower segmented forming rolls 34.

Pistons 104 and 45 are arranged so that the lower rotating forming rolls 34 are disposed below the plane common to the uppermost portions of the rigidly supported conveyor rolls 25 and the upper segmented forming rolls 47 are initially disposed in spaced relation above at the start of a roll forming cycle. When a glass sheet moves into the roll forming station 24 on conveyor rolls 25, lower piston 104 extends upward to cause the concavely shaped rotating forming rolls 34 to engage the the opposite side edges of the glass sheet. This tends to kink the longitudinal side edges of the glass, particularly since the longitudinal side edges tend to become hotter than the main portion of the glass during their conveyance through the furnace 22.

What has been described thus far is a typical prior art roll forming apparatus. Other details of roll forming apparatus structure not described herein may be incorporated. However, their presence or absence does not affect the present invention, so the reader is invited to refer for their details to the following patents, the disclosure of which is incorporated herein by reference: U.S. Pat. No. 3,701,643 to Frank; U.S. Pat. No. 3,701,644 to Frank; U.S. Pat. No. 3,807,546 to Canonaco; U.S. Pat. No. 3,807,982 to Claassen et al; U.S. Pat. No. 3,856,499 to Frank; U.S. Pat. No. 3,869,269 to Knapp; U.S. Pat. No. 3,871,855 to Frank; U.S. Pat. No. 3,891,420 to Frank; U.S. Pat. No. 3,929,441 to Frank; U.S. Pat. No. 3,934,996 to Frank and U.S. Pat. No. 3,978,974 to Morrissey et al.

In order to reduce the tendency of the longitudinal side edge portions to kink, a pair of manifolds 70 is provided between the exit of the furnace 22 and the first pair of complementary forming rolls 34 and 47 in the roll forming station 24. Each manifold is connected to a source of air through a flexible air hose 72. The manifolds are provided with apertures in their upper wall or roof along lines of apertures extending diagonally relative to the length of the conveyor. Since glass sheets of different widths are treated in the roll forming apparatus, provision is made for lateral positional adjustment of one or both manifolds 70 so that air directed against the glass sheets passing thereover is aligned with the edge portion of the glass. A typical position adjusting mechanism comprises one or more slotted support bars 74 attached to fixed vertically slotted bars 75 below the position occupied by the conveyor rolls and apertured flanges 76 extending from a convenient wall of each manifold 70. Attachment bolts through the apertures and the slots fix the transverse position of the corresponding manifold 70 and the spacing between the manifold and the glass.

Each manifold 70 in a preferred embodiment provides an apertured surface that faces a side edge portion of the moving glass sheets. The facing surface extends approximately 6 inches (15 centimeters) in the direction of glass movement and 3 inches (7.6 centimeters) transverse to the direction of glass movement with the upper apertured wall of the manifold disposed 1 to 2 inches (2.5 to 5 centimeters) below the glass supporting plane. Holes of one-eighth inch diameter (3 millimeters) are drilled on 1 inch (2.5 centimeter) centers along parallel lines oblique by 45° to the direction of glass movement. Ambient air is supplied to the manifold at a pressure of 10 ounces per square inch in an operation involving glass sheets having a nominal thickness of five thirty-second inch (4 millimeters). The manifolds are located below the glass sheet path to impinge air upwardly on the glass edge portions to be cooled. A manifold position above the conveyor should be avoided as downward air blasts warp the glass sheets.

Figure 4:
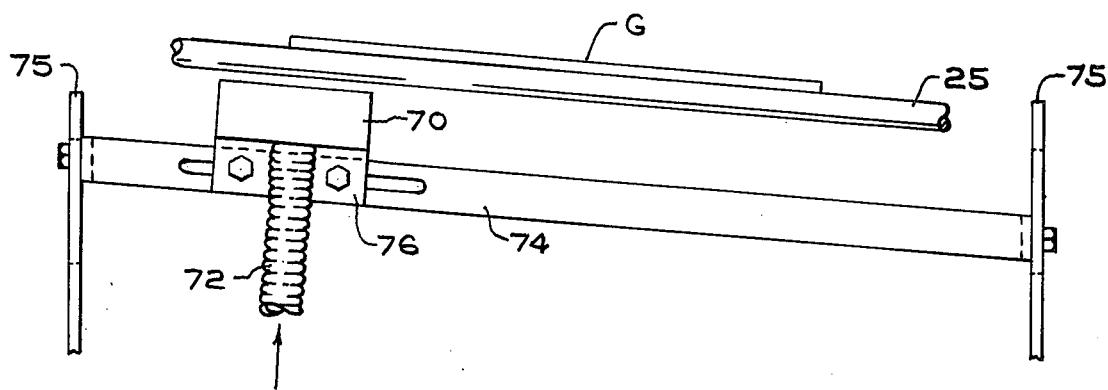
FIG. 4 is a schematic, fragmentary, transverse elevational view showing how a single manifold is installed between the exit of the furnace and the roll forming station of the embodiment of FIG. 3.
Figure 3:
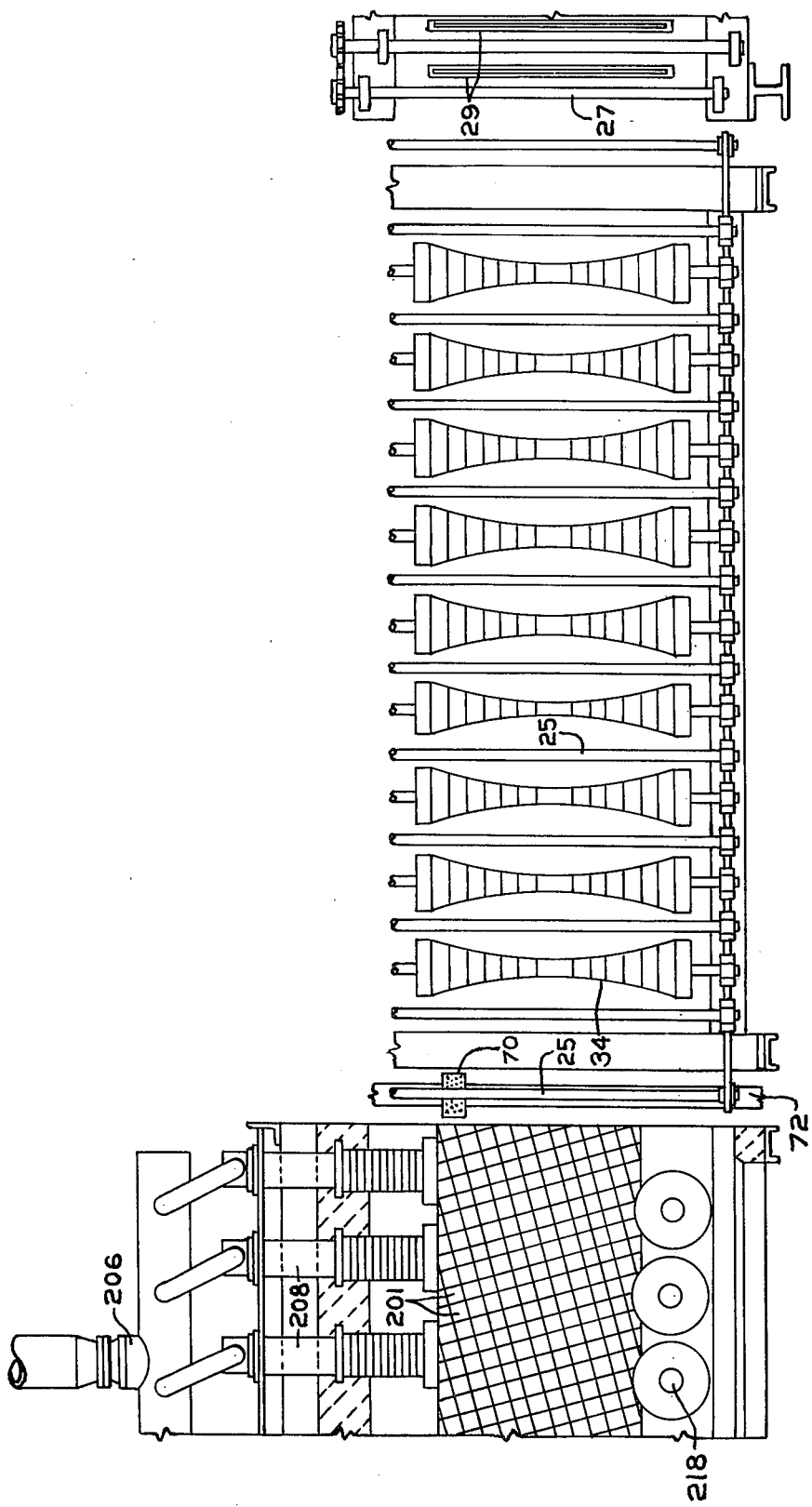
FIG. 3 is a fragmentary plan view of an alternate embodiment of the present invention in which a roll forming setup utilizing a glass heating furnace is of the gas hearth type.

FIGS. 3 and 4 show an embodiment comprising a heated furnace of the gas hearth type, which may be used to replace either the entire furnace or the hot end only of the roller hearth type of furnace described as forming part of the first embodiment. In a gaseous hearth system, such as the one used in the second embodiment which is based on apparatus depicted in U.S. Pat. No. 3,233,501 to James C. Fredley et al, the furnace is provided with a flat bed formed of a series of modules 201 in spaced but close juxtaposition to each other and arranged geometrically like a mosaic. Each module has an upper terminus of rectangular configuration. The upper termini lay in a common plane that is obliquely arranged at an angle of 2° to 10°, preferably 5°, to the horizontal transversely of the bed. The common plane extends horizontally lengthwise of the bed, although the upper plane of the gas bed may be angled at a small angle to the horizontal, if desired.

The modules 201 are arranged in successive rows crossing the path of travel intended for glass sheets undergoing treatment, each row being at an oblique angle of about 10° to the path taken by the glass sheets. Each row is spaced close to the next adjacent row. Each module 201 opens up into one of a series of module plenum chambers positioned in end to end relation to one another below the bed and acting as a support for the bed.

Each module is substantially enclosed and spaced from adjacent modules by an exhaust zone. The bed is adjusted to such a level that the plane of the upper termini of the modules lies parallel to, but just below a plane defined by the upper surface of the conveyor rolls 25 of the roll forming station 24.

The modules are in communication with one of the elongated plenum chambers which receives hot gas from a series of gas burners 206 through conduits 208. Conventional electric heating elements are disposed above and below the elongated plenum chamber. Hot gas is supplied to the elongated plenum chambers under pressure for delivery through the individual modules 201 to provide a hot gaseous bed on which glass sheets are supported in an oblique almost horizontal plane while they are heated to a temperature sufficient for deformation.

The glass sheets are engaged along their lower side edges only by means of a series of longitudinally aligned driving discs 218 disposed in a series along the lower side edge of the bed. Each of the driving discs 218 is mounted on a different rotating shaft. The discs rotate in unison to propel a series of glass sheets along the length of the gaseous bed toward the roll forming station 24.

The roll forming station 24 of this embodiment is similar to that of the previous embodiment. However, the upper common tangential plane for the conveyor rolls 25 in the roll forming station 24 is disposed in a plane forming an extension of the oblique plane of support provided by the gaseous bed formed by the array of modules 201 in the furnace.

Since the glass sheets move obliquely through the furnace with their lower edges engaged by spaced rotating driving discs 218, and the upper edges of the glass sheets so supported are exposed to hot gas emanating from individual modules 201 disposed above and transversely of the upper edge of the glass sheets moving through the furnace, the upper edge portions of the glass sheets so treated tend to become hotter than the remainder of the glass sheets as the latter pass through the furnace. Intermittent contact of the lower edge of each glass sheet with the rotating driving discs 218 tends to retard heating of the lower edge portions and to maintain the glass sheets more resistant to kinking along their bottom edges when treated by this embodiment of the invention than is the case with the roller conveyor embodiment of FIGS. 1 and 2. Therefore, it is preferred for the embodiment of FIGS. 3 and 4 that only a single manifold 70 of the type depicted in FIGS. 1 and 2 be provided for transverse positioning to face the upper edge portion of the glass sheets as they transfer between the exit of the furnace and the entrance of the roll forming station.

The amount of air that is blown through the manifolds is nominal and dependent upon various factors such as the thickness of the glass sheets, the temperature of the glass at the furnace exit, and the speed of glass movement as it is transferred from the furnace to the roll forming station. The manifolds of the present invention are preferably mounted below the conveyor rolls and are mounted for positional adjustment laterally so that they face one or both of the side edge portions of the glass sheets being processed along an edge portion approximately 2 inches (5 centimeters) wide.

The forms of the invention shown and described in this disclosure represent certain illustrative preferred embodiments thereof. It is understood that various changes may be made without departing from the gist of the invention as defined by the claimed subject matter that follows.

I claim:

1. In the method of shaping a series of glass sheets wherein each sheet in succession is conveyed through a furnace and heated therein to a softened condition sufficient for bending, then conveyed beyond the furnace in a longitudinal direction on conveyor means providing substantially horizontal support for the sheet into a bending zone where a set of lower rotating forming rolls having concave axial curvatures transverse to the direction of glass travel rise to lift the sheet above said conveyor means into rolling engagement with a set of upper rotating forming rolls having complementary convex axial curvatures transverse to the direction of glass travel, thereby imparting a curvature to the sheet, and wherein initial contact between a longitudinal side edge portion of the sheet and the lower forming rolls while central portions of the sheet remain out of contact with the lower forming rolls produces a localized bending force sufficient to cause kinking of the longitudinal side edge portion, the improvement comprising differentially applying a superficial stream of cooling fluid onto said longitudinal side edge portion of the sheet after the sheet leaves the furnace and before the sheet is contacted by the lower forming rolls so as to cool the longitudinal side edge portion to a greater extent than said central portions of the sheet to a sufficient degree to impart resistance to kinking in the longitudinal side edge portion.

2. The improvement according to claim 1, wherein two longitudinal side edge portions of each said glass sheet are superficially cooled between the time that said sheet leaves said furnace and the time it is engaged to be lifted by said lower rotating forming rolls.

3. The improvement according to claim 2, wherein said series of glass sheets is conveyed through said furnace on a series of longitudinally spaced, horizontally extending conveyor rolls whereby the opposite side edge portions of said sheets are heated to a slightly higher temperature than the main portion of said sheets during passage through said furnace.

4. The improvement according to claim 1, wherein said series of glass sheets is conveyed along a gas hearth conveyor and supported at an oblique angle transverse to the length of said conveyor with a series of rotating discs engaging the lower edge of each said glass sheets as the latter traverses said furnace, whereby the upper edge portion of each said glass sheet develops a higher temperature than the lower edge portion during conveyance of said sheet through said furnace, wherein only said upper edge portion is superficially cooled between the time said sheet leaves said furnace and is engaged by said lower rotating forming rolls.

5. The improvement according to claim 1, wherein said superficial cooling is accomplished by directing air blasts upwardly against the bottom edge of each successive glass sheet along at least one side edge portion.

6. The improvement according to claim 5, wherein both longitudinal side edge portions of each said glass sheet are superficially cooled between the time that said sheet leaves said furnace and the time it is engaged to be lifted by said lower rotating forming rolls.

7. The improvement according to claim 6, wherein said series of glass sheets is conveyed through said furnace on a series of longitudinally spaced, horizontally extending conveyor rolls whereby the opposite longitudinal side edge portions of said sheets are heated to a slightly higher temperature than the main portion of said sheets during passage through said furnace.

8. The improvement according to claim 5, wherein said series of glass sheets is conveyed along a gas hearth conveyor and supported at an oblique angle transverse to the length of said conveyor with a series of rotating discs engaging the lower edge of each said glass sheets as the latter traverses said furnace, whereby the upper edge portion of each said glass sheet develops a higher temperature than the lower edge portion during conveyance of said sheet through said furnace, wherein only said upper edge portion is superficially cooled between the time said sheet leaves said furnace and is engaged by said lower rotating forming rolls.

* * * * *